US006769100B2

(12) United States Patent
Acar et al.

(10) Patent No.: US 6,769,100 B2
(45) Date of Patent: Jul. 27, 2004

(54) METHOD AND SYSTEM FOR POWER NODE CURRENT WAVEFORM MODELING

(75) Inventors: Emrah Acar, Austin, TX (US); Sani Richard Nassif, Austin, TX (US)

(73) Assignee: International Business Machines Corporation, Amonk, NY (US)

( * ) Notice: Subject to any disclaimer, the term of this patent is extended or adjusted under 35 U.S.C. 154(b) by 74 days.

(21) Appl. No.: 10/242,235

(22) Filed: Sep. 12, 2002

(65) Prior Publication Data

US 2004/0054974 A1 Mar. 18, 2004

(51) Int. Cl.$^7$ .............................................. G06F 17/50
(52) U.S. Cl. ...................... 716/4; 716/2; 716/5; 716/6; 703/13; 703/14; 703/19
(58) Field of Search ............................... 716/2, 4, 5, 6; 703/13, 14, 19

(56) References Cited

U.S. PATENT DOCUMENTS

| 5,553,008 | A | * | 9/1996 | Huang et al. ................... | 703/14 |
| 5,838,947 | A | * | 11/1998 | Sarin ............................. | 703/14 |
| 6,066,177 | A | * | 5/2000 | Hatsuda ........................ | 703/19 |
| 6,496,960 | B1 | * | 12/2002 | Kashyap et al. ................ | 716/4 |
| 6,499,129 | B1 | * | 12/2002 | Srinivasan et al. ............. | 716/4 |
| 2002/0016950 | A1 | * | 2/2002 | Sakamoto ....................... | 716/6 |
| 2002/0174409 | A1 | * | 11/2002 | Cohn et al. ..................... | 716/6 |

OTHER PUBLICATIONS

Jun et al., "An accurate and efficient delay time modeling for MOS logic circuits using polynomial approximation." Computer–Aided Design of Integrated Circuits and Systems, IEEE Transaction on, vol.: 8, Issue: 9, Sep. 1989.*

Krishnan et al., "A novel adaptive algorithm applied to a class of redundant representation vector quantizers for waveform and model based coding." Circuits and Systems, 2002. ISCAS 2002. IEEE International Symposium on, vol.: 4, May 26–29, 2002.*

* cited by examiner

Primary Examiner—Matthew Smith
Assistant Examiner—Andrea Liu
(74) Attorney, Agent, or Firm—Casimer Salys; Weiss, Moy & Harris, P.C.; Andrew M. Harris

(57) ABSTRACT

A method and system for power node current waveform modeling provides improved accuracy for logic gate and functional block power node current models in computer-based verification and design tools. An output voltage waveform is generated, with each point a linear function of a set of input values corresponding to times at which the output voltage reaches predetermined fractions of the supply voltage. A set of coefficients is used for each point, as each output voltage has a different linear dependency on the input values. The output voltage waveform model is differentiated and multiplied by an effective load capacitance to determine an output current waveform. The method and system retain compatibility with existing software by using input values already present in the digital simulation models (e.g., delay times) that yield a subset of output voltage points. The coefficients of the model are predetermined for a circuit from principle components analysis.

24 Claims, 4 Drawing Sheets

METHOD AND SYSTEM FOR POWER NODE CURRENT WAVEFORM MODELING

BACKGROUND OF THE INVENTION

1. Field of the Invention

The present invention generally relates to systems for modeling the behavior of integrated circuits such as verifiers, simulators and design tools, and more particularly to a computer program that includes modeling of digital integrated circuit power supply pin current waveforms.

2. Description of Related Art

Design tools and verification tools are necessary for modeling large-scale digital integrated circuits such as Very Large Scale Integration (VLSI) circuits. Millions of transistors and logic gates are often combined on a single die and the performance of the die is modeled using software that models the performance of the overall die based on known (modeled) performance of individual gates, inverter/buffer models of gates, or models of larger functional blocks.

Power supply current for individual gates or blocks combines to generate the power requirements for the overall die, and will typically combine in sub-groups to several power and ground pins that are connected external to the integrated circuit package. The power supply pin connections are typically inductive, while the external power supplies to which the power pins connect are typically capacitive loads. The inductive pin characteristic leads to voltage noise as the changing power supply currents generate voltage drops across the pin inductances. Therefore, knowledge of power supply currents at power nodes of logic gates or larger functional blocks is valuable for knowing overall current consumption and time-dependent behavior and for induced/radiated noise modeling.

Present techniques for power supply node current modeling typically calculate power node current based upon a linear (ramp) model of input and output voltages. Since the predominant (typically >90%) component of power node current derives from output capacitance charging and discharging, the typical power node current model calculates the power node current as the output load capacitance times the slope of the output voltage waveform, which is further typically simplified as a risetime/load capacitance product. The linear output voltage ramp thus yields a step (pulse) current component in the model, although providing a useful approximation, is inaccurate in modeling power supply behavior and is generally unsuitable for noise analysis. Further, as power supply voltages are decreased (which is the trend for high-density integrated circuits to reduce power dissipation and noise), the linear input voltage risetime model is increasingly inaccurate.

While more accurate models may be produced using more detailed analog circuit analysis or waveshape fitting, the memory requirements and processing time are prohibitive for modeling large-scale circuits. Further, the analog and waveshape models are not directly compatible with existing power pin current models and logic gate models.

Therefore, it is desirable to implement an improved power node current waveform modeling algorithm. It would further be desirable to provide an algorithm that is compatible with existing power supply pin current and logic gate models.

SUMMARY OF THE INVENTION

The objective of providing an improved power node current waveform modeling algorithm is achieved in a method for modeling characteristics of a logical circuit block. The method generates an output voltage waveform of the logical circuit block by using a linear model that calculates points of the waveform from known points received as inputs. The inputs to the method are time values at which the output voltage reaches predetermined fractions of an input voltage signal. The time values are multiplied by coefficients from a set of coefficients for each output waveform point that are determined from a statistical model of logical circuit block behavior, yielding an output voltage waveform. The calculated output voltage waveform can then be differentiated and multiplied by a predetermined load capacitance to yield an output current waveform. The method retains compatibility with present timing simulators, as the delay time (taken as the 50% voltage point) and the rise time (which yields a difference of the 70% and 30% voltage points or other pair of voltage points) can be used to provide the input time values.

The invention may further be embodied in a workstation computer executing program instructions for carrying out the steps of the method, and in a computer program product having a storage media for those program instructions.

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

Figure 1:
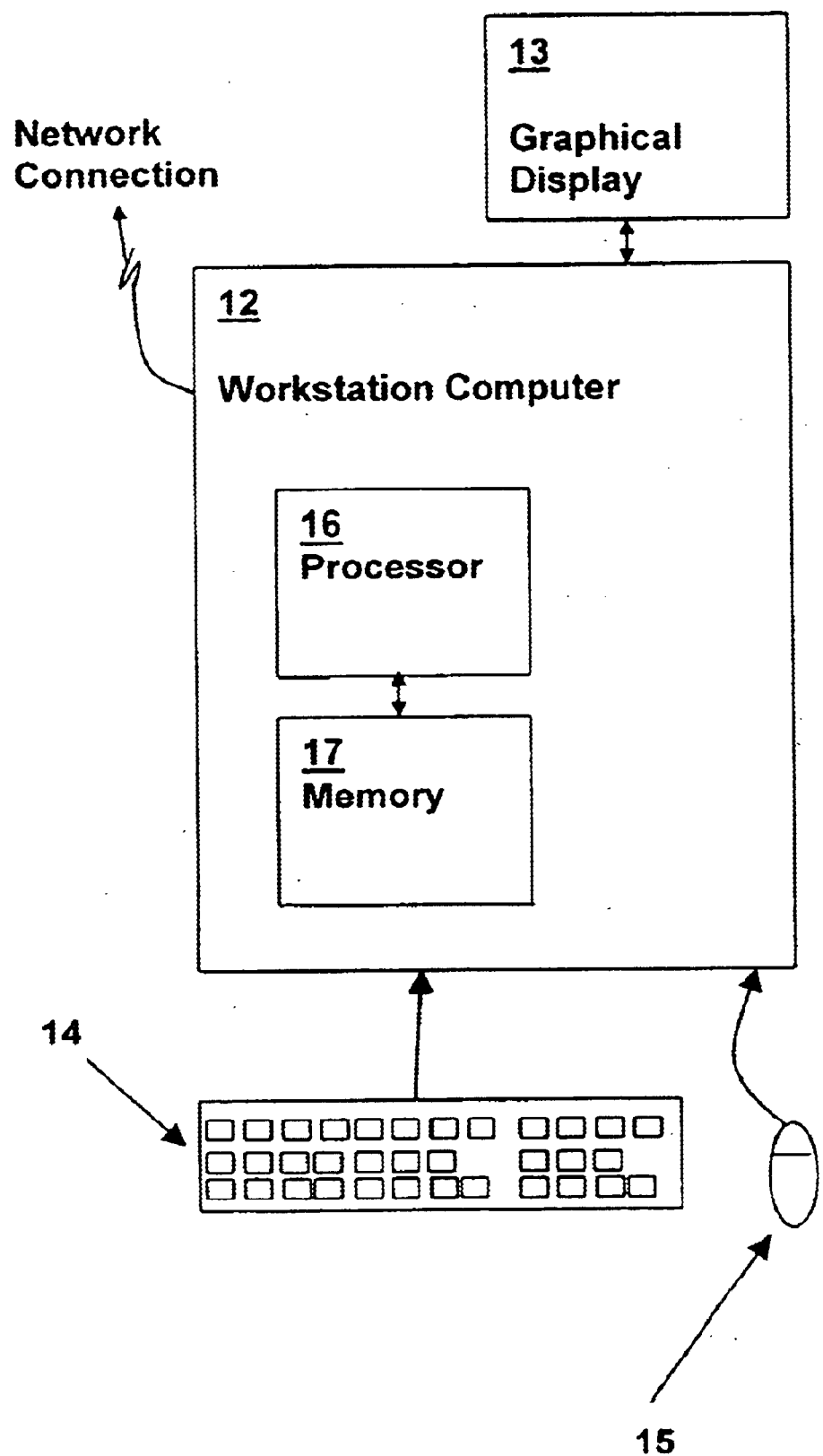
FIG. 1 is a pictorial diagram of a workstation computer system in which methods in accordance with an embodiment of the present invention are performed.

Referring to the figures, and particularly to FIG. 1, a workstation computer system, in which methods according to an embodiment of the present invention are performed, is depicted. A workstation computer 12, having a processor 16 coupled to a memory 17, for executing program instructions from memory 17, wherein the program instructions include program instructions for executing one or more methods in accordance with an embodiment of the present invention.

Workstation computer 12 is coupled to a graphical display 13 for displaying program output such as simulation results and circuit structure input and verification programs implementing embodiments of the present invention. Workstation computer 12 is further coupled to input devices such as a mouse 15 and a keyboard 14 for receiving user input. Workstation computer may be coupled to a public network such as the Internet, or may be a private network such as the various "intra-nets" and software containing program instructions embodying methods in accordance with embodiments of the present invention may be located on remote computers or locally within workstation computer 12.

Figure 2A:
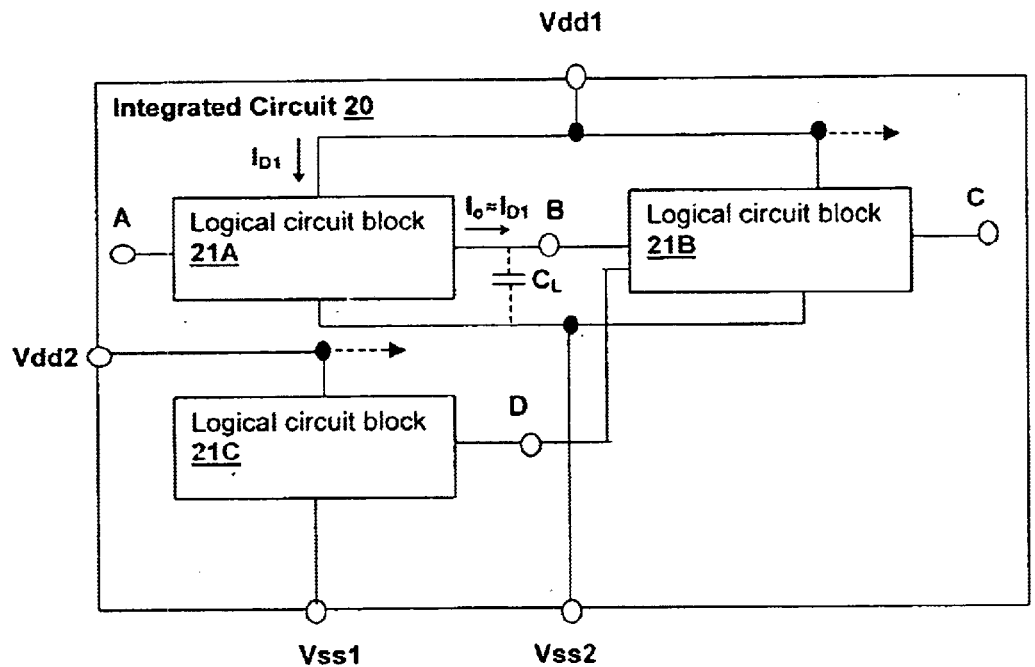
FIG. 2A is a block diagram of a logical circuit block representation in accordance with methods embodying the present invention.
Figure 2B:
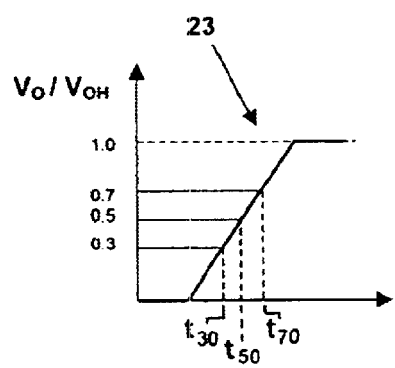
FIGS. 2B–2D are graphs depicting voltage and current waveforms within the logical circuit block of FIG. 2A.
Figure 2C:
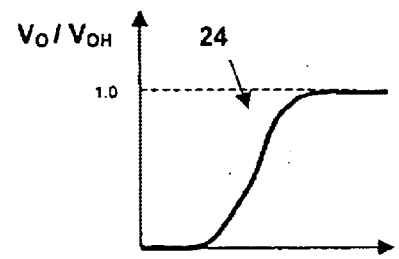
Figure 2D:
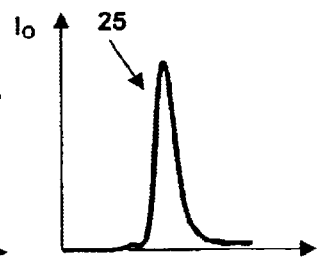

Referring now to FIG. 2A, a block diagram of a simplified integrated circuit 20 for illustrating the models of the present invention is shown. Logical circuit blocks 21A, 21B and 21C may be gates, inverters/buffers or larger digital functional blocks. FIG. 2B depicts a simulated voltage waveform 23 for logical circuit block 21A using existing simulation algorithms. To simulate the output current required when logical circuit block 21A changes its output value, the effective load capacitance $C_L$ may be multiplied by the derivative of the voltage waveform shown in graph 23, but that would yield a constant current due to the linear rise of $V_o$, yielding inaccurate results. An actual output voltage waveform 24 and current waveform 25 are shown in FIGS. 2C and 2D respectively, to depict the differences between linear voltage/pulse current models as implemented in typical simulation software and the actual shapes of power supply node current 25 and logic output voltage waveforms 24 for logic block 21A within integrated circuit 20.

The power supply current $I_{D1}$ for an individual block 21A may be accurately calculated from load capacitance $C_L$ and the output voltage waveform at node B, as cross-conduction and other sources of internal gate dissipation are generally insignificant compared to the current required to drive the output load (which includes generally one or more transistor gates in addition to circuit path capacitance). In order to model the current waveform at an external pin of integrated circuit 20 such as $V_{dd1}$, current may be modeled for each of the power nodes of the logical circuit blocks (21A, 21B and any other blocks connected to pin $V_{dd1}$), and summed together to achieve an overall current waveform.

In order to accurately model current $I_{D1}$ (and consequently the power pin $V_{dd1}$, $V_{dd2}$, $V_{ss1}$, and $V_{ss2}$ current once all logic block power node currents are modeled), an accurate model of the output voltage waveforms of each of the logical circuit blocks are needed. However, typical simulation software only calculates a rise time and delay for each logical circuit block. The present invention provides a method for using the rise time and delay to generate a highly accurate model of a logic block output voltage waveform. The output voltage waveform is differentiated, either by calculating the slope of the lines between points of the calculated waveform (linear method) or using a higher order derivative approximation technique.

Figure 3:
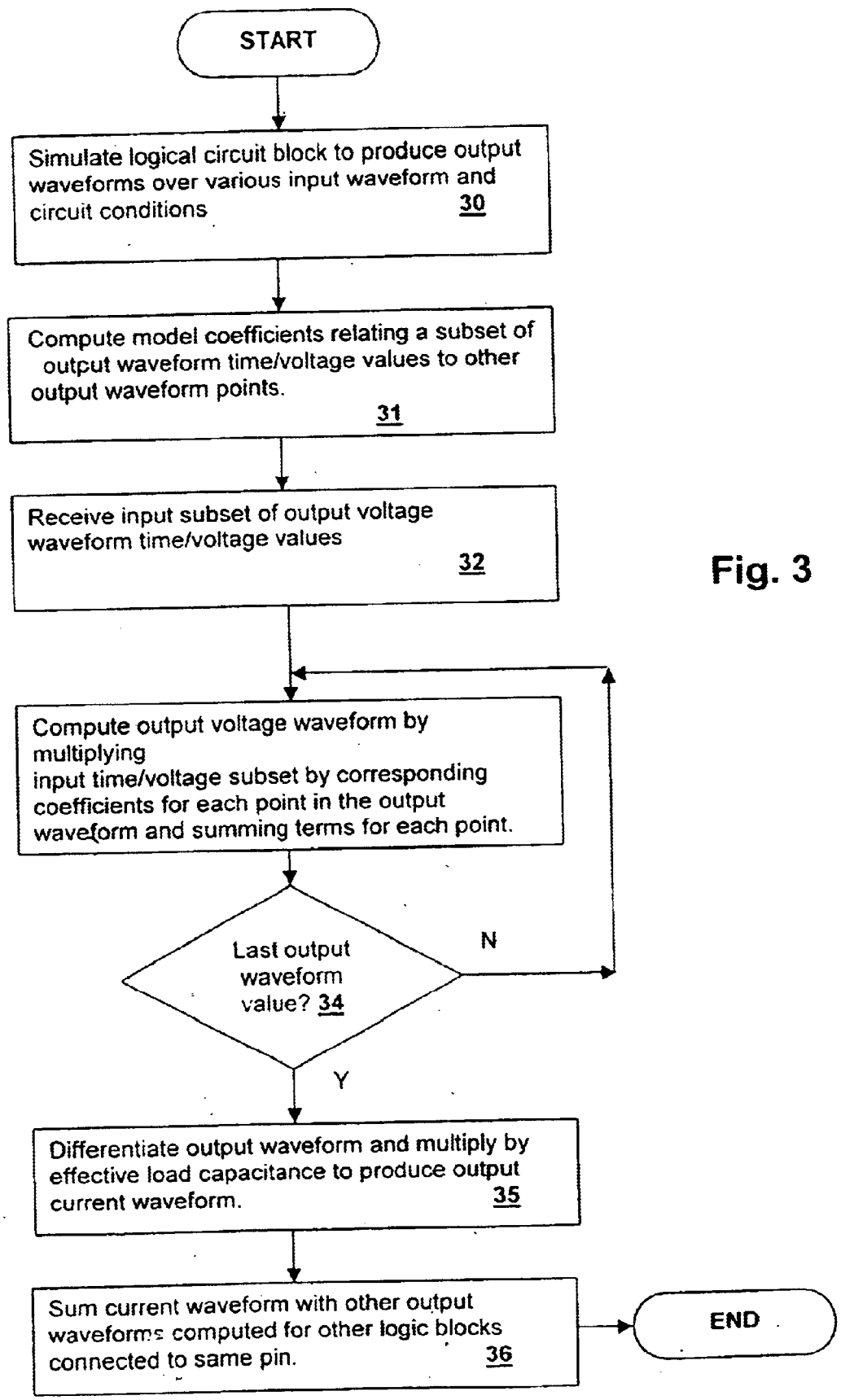
FIG. 3 is a flow chart depicting a method in accordance with an embodiment of the present invention.

Referring now to FIG. 3, a method in accordance with an embodiment of the present invention is depicted in a flowchart. First the logical circuit block is simulated in an analog fashion (using SPICE or another analysis tool) to produce output waveforms (step 30) over various input waveform and circuit conditions, such as power supply voltage, input voltage rise time and input voltage swing. After a large number of waveforms have been generated, a statistical model is used to compute coefficients relating a subset of output waveform time/voltage fraction points (i.e., the points in time at which the output waveform voltage reaches a particular fraction of the power supply voltage) to the other points in the output voltage waveform (step 31). Steps 30 and 32 need only be performed for a given logical circuit block once. The linear coefficients are then retained for subsequent generation of the output voltage waveform in circuit timing simulation.

During timing simulation, an input set of output voltage waveform time/value fraction values (i.e., points in time at which the output voltage waveform have reached predetermined fractions of the supply voltage) are received (step 32). The input values received may be the delay time and rise time of the logic block, as the delay time is the time when the output voltage reaches half of the supply voltage and the rise time is the difference between the time that the output voltage reaches 70% of supply voltage and the time that the output voltage reaches 30% of the supply voltage. Another pair of voltage points such as the 20% and 80% or 10% and 90% points may be used to determine the rise time input, and the method of the present invention is not restricted to the use of delay and rise time, but may use any calculated voltage points to calculate the other points in the waveform using the statistically-derived coefficients.

The output voltage waveform is computed by multiplying the delay time and rise time by the linear coefficients determined in steps 30 and 31 and summing the resulting terms for each output voltage waveform point (step 33). After all of the output waveform points are generated (decision 34), the output waveform is differentiated and multiplied by an effective load capacitance to produce an output current waveform (step 35). If the integrated circuit pin currents are being modeled, waveforms generated for each of the logical circuit blocks having power nodes connected to the pin are summed to produce a current waveform for the pin (step 36).

Figure 4:
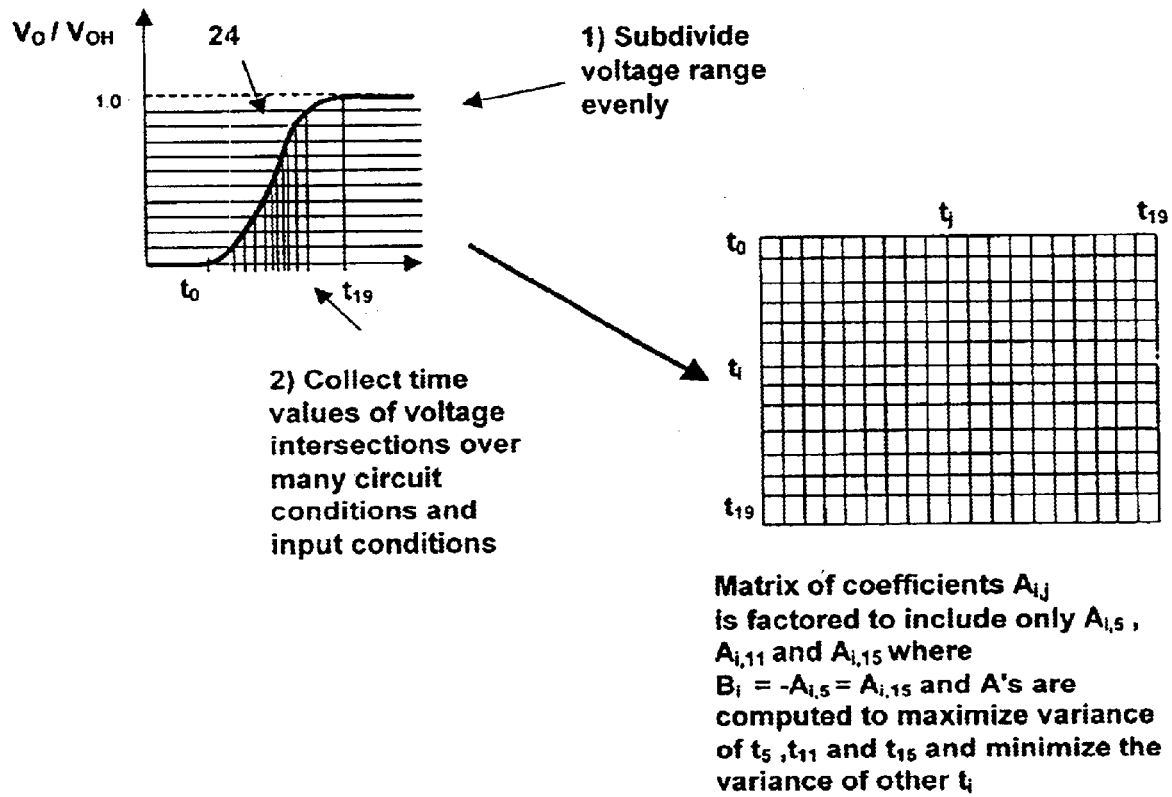
FIG. 4 is a pictorial diagram depicting the flow of a method in accordance with an embodiment of the present invention.

Referring now to FIG. 4, a flow diagram depicting generation of the model of present invention is shown. First, the output voltage waveform is modeled as a set of discrete points in time for which the output voltage waveform reaches predetermined fractions of the supply voltage. As an example, a 20 point waveform model is used in herein (e.g., 0–100% in 5% steps) numbered from 0 to 19 and indices mentioned refer to the voltage/time pairs in the 20 point sequence. Therefore, the 50% voltage point is taken as index 11 and the 30% and 70% points are taken as indices 5 and 15, respectively. The above-chosen voltage/time pairs permit direct use of the 50% delay time and 30%–70% rise time as input to the output voltage waveform model.

Next, a matrix of the time points is generated to calculate the other time points. Naturally, the identity matrix will yield the exact time points, since each point in the waveform would be used to calculate itself with a coefficient of unity. However, the objective is to reduce the number of input points required to construct a model of the output waveform, in particular to reduce the model to require as input only the delay and rise time predicted voltage points. The matrix is factored to include only $A_{i,11}$ (the 50% delay time coefficients) and $A_{i,5}$, $A_{i,15}$ where $B=A_{i,15}=-A_{i,5}$, yielding a model that can calculate all of the waveform points from the delay time $t_{11}$ and the rise time $t_{15}-t_5$ (Since the contributions from $t_5 A_{i,5}+t_{15} A_{i,15}$ reduce under the constraint to $B(t_{15}-t_5)$. It should be noted, that while the model is a linear model using linear equations to calculate the output voltage waveform, the coefficients are unique to each output waveform voltage point and therefore is not modeling the output waveform as a straight line or multi-slope line, but as a complex relationship between the known input points and each output point.

The process of reducing the number of factors to model the entire matrix is a process known as "factoring" and a method that may be used to generate the values for the coefficients is "principle components analysis" which many commercial statistical software packages support. Principle components analysis determines coefficients for selected factors by maximizing the variance of the selected factors while minimizing the variance of the other points. The variance minimization/maximization produces coefficients that will generate the other points in the matrix with minimal deviation generated by variations in the input values, which correspond to known elements and are not calculated in the model. Therefore, no matter what the variance in the input values, the other values computed to complete the waveform model will have minimal dependence on any deviations in the input values.

A correlation check was used to verify the accuracy of the model, as well as error plots and "scree" diagrams that show the model error as a function of the number of selected input values. For an exemplary modeling of the present invention, the correlation coefficients have been shown to be not less than 0.999 for each linear equation, with a peak-to-peak error of less than 20% over all of the modeled circuit and input conditions. The error generated by the model for two input variables yielded an unexplained error level of 0.05%, showing that two variables (rise time and delay time) are sufficient to generate the output voltage waveform without introducing significant error due to the model.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for modeling characteristics of a logical circuit block, comprising:
   receiving input of a first plurality of values corresponding to times at which an output voltage of said logical circuit block reaches selected predetermined fractions of a supply voltage; and
   generating a second time value for which said output voltage reaches a different predetermined fraction of said supply voltage by
      multiplying each of said plurality of values by a corresponding one of a set of coefficients that statistically relate said first plurality of input values to said second time value, and
      summing the multiplied values to produce a resulting time at which said output voltage reaches said different predetermined fraction of said supply voltage.

2. The method of claim 1, further comprising repeating said generating to generate a second plurality of time values at which said output voltage reaches other predetermined fractions of said supply voltage, whereby a waveform representing an output voltage of said logical circuit block is generated.

3. The method of claim 2, further comprising:
   differentiating said output voltage waveform representation; and
   multiplying a result of said differentiating by an effective load capacitance to produce current values representing an output current waveform.

4. The method of claim 3, wherein said receiving, generating, differentiating, and multiplying are repeated for multiple logical circuit blocks resulting in a plurality of output current waveforms and further comprising summing said output current waveforms to provide a pin current for an integrated circuit package containing said logical circuit blocks.

5. The method of claim 2, wherein said first plurality of input values comprises a third time value corresponding to a supply voltage fraction of 0.3, a fourth time value corresponding to a supply voltage fraction of 0.5 and a fifth time value corresponding to a supply voltage fraction of 0.7, and wherein said coefficient corresponding to said third time value and said coefficient corresponding to said fifth time value are equal in magnitude and opposite in sign, whereby said generating may be performed in conformity with a delay time and a rise time of said logical circuit block.

6. The method of claim 2, wherein said first plurality of input values comprises a third time value corresponding to a supply voltage fraction of 0.5, a fourth time value corresponding to another supply voltage fraction less than 0.5 by a predetermined amount, and a fifth time value corresponding to a supply voltage fraction greater than 0.5 by said predetermined amount, and wherein said coefficient corresponding to said fourth time value and said fifth time value are equal in magnitude and opposite in sign, whereby said generating may be performed in conformity with a delay time and a rise time of said logical circuit block.

7. The method of claim 1, wherein said first plurality of input values comprises a third time value corresponding to a supply voltage fraction of 0.3, a fourth time value corresponding to a supply voltage fraction of 0.5 and a fifth time value corresponding to a supply voltage fraction of 0.7, and wherein said coefficient corresponding to said third time value and said coefficient corresponding to said fifth time value are equal in magnitude and opposite in sign, whereby said generating may be performed in conformity with a delay time and a rise time of said logical circuit block.

8. The method of claim 1, further comprising:
   simulating said logical circuit block over a variety of input waveforms and circuit conditions to produce a plurality of output voltage waveforms for said logical circuit block; and
   determining said set of coefficients each relating a time at which said output voltage waveform reaches said selected predetermined fractions of said supply voltage to times at which said output voltage waveform reaches different predetermined fractions of said supply voltage via a statistical reduction of said plurality of output voltage waveforms that maximizes the variance of times at which said output voltage waveforms reach said selected predetermined fractions of said supply voltage and minimizes the variance of other times at which said output voltage waveforms reach said different predetermined fractions of said output voltage.

9. A computer program product for use with a workstation computer, wherein said computer program product comprises signal bearing media containing program instructions for execution within said workstation computer for modeling characteristics of a logical circuit block, wherein said program instructions comprise program instructions for:
   receiving input of a first plurality of input values corresponding to times at which an output voltage of said logical circuit block reaches selected predetermined fractions of a supply voltage; and
   generating a second time value for which said output voltage reaches a different predetermined fraction of said supply voltage by
      multiplying each of said first plurality of input values by a corresponding one of a set of coefficients that statistically relate said first plurality of input values to said second time value, and
      summing the multiplied values to produce a resulting time at which said output voltage reaches said different predetermined fraction of said supply voltage.

10. The computer program product of claim 9, wherein said program instructions further comprise program instructions for repeating said program instructions for generating to generate a second plurality of time values at which said output voltage reaches other predetermined fractions of said supply voltage, whereby a waveform representing an output voltage of said logical circuit block is generated.

11. The computer program product of claim 10, wherein said program instructions further comprise program instructions for:
   differentiating said output voltage waveform representation; and
   multiplying a result of said differentiating by an effective load capacitance to produce current values representing an output current waveform.

12. The computer program product of claim 11, wherein said program instructions further comprise program instructions for repeating said receiving, generating, differentiating, and multiplying for multiple logical circuit blocks resulting in a plurality of output current waveforms and further comprising program instructions for summing said output current waveforms to provide a pin current for an integrated circuit package containing said logical circuit blocks.

13. The computer program product of claim 10, wherein said plurality of input values comprises a third time value corresponding to a supply voltage fraction of 0.3, a fourth time value corresponding to a supply voltage fraction of 0.5 and a fifth time value corresponding to a supply voltage fraction of 0.7, and wherein said coefficient corresponding to said third time value and said coefficient corresponding to said fifth time value are equal in magnitude and opposite in sign, whereby said generating may be performed in conformity with a delay time and a rise time of said logical circuit block.

14. The computer program product of claim 10, wherein said plurality of input values comprises a third time value corresponding to a supply voltage fraction of 0.5, a fourth time value corresponding to another supply voltage fraction less than 0.5 by a predetermined amount, and a fifth time value corresponding to a supply voltage fraction greater than 0.5 by said predetermined amount, and wherein said coefficient corresponding to said fourth time value and said fifth time value are equal in magnitude and opposite in sign, whereby said generating may be performed in conformity with a delay time and a rise time of said logical circuit block.

15. The computer program product of claim 9, wherein said plurality of input values comprises a third time value corresponding to a supply voltage fraction of 0.3, a fourth time value corresponding to a supply voltage fraction of 0.5 and a fifth time value corresponding to a supply voltage fraction of 0.7, and wherein said coefficient corresponding to said third time value and said coefficient corresponding to said fifth time value are equal in magnitude and opposite in sign, whereby said generating may be performed in conformity with a delay time and a rise time of said logical circuit block.

16. The computer program product of claim 9, wherein said program instructions further comprise program instructions for:
    simulating said logical circuit block over a variety of input waveforms and circuit conditions to produce a plurality of output voltage waveforms for said logical circuit block; and
    determining said set of coefficients each relating a time at which said output voltage waveform reaches said selected predetermined fractions of said supply voltage to times at which said output voltage waveform reaches different predetermined fractions of said supply voltage via a statistical reduction of said plurality of output voltage waveforms that maximizes the variance of times at which said output voltage waveforms reach said selected predetermined fractions of said supply voltage and minimizes the variance of other times at which said output voltage waveforms reach said different predetermined fractions of said output voltage.

17. A workstation comprising:
    a memory for storing program instructions and data values for modeling characteristics of a logical circuit block;
    a processor for executing said program instructions, wherein said program instructions comprise program instructions for
        receiving input of a first plurality of input values corresponding to times at which an output voltage of said logical circuit block reaches selected predetermined fractions of a supply voltage, and
        generating a second time value for which said output voltage reaches a different predetermined fraction of said supply voltage by
            multiplying each of said first plurality of input values by a corresponding one of a set of coefficients that statistically relate said first plurality of input values to said second time value, and
            summing the multiplied values to produce a resulting time at which said output voltage reaches said different predetermined fraction of said supply voltage.

18. The workstation of claim 17, wherein said program instructions for generating are repeated to generate a second plurality of time values at which said output voltage reaches other predetermined fractions of said supply voltage, whereby a waveform representing an output voltage of said logical circuit block is generated.

19. The workstation of claim 18, wherein said program instructions further comprise program instructions for:
    differentiating said output voltage waveform representation; and
    multiplying a result of said differentiating by an effective load capacitance to produce current values representing an output current waveform.

20. The workstation of claim 19, wherein said program instructions for receiving, generating, differentiating, and multiplying are repeated for multiple logical circuit blocks resulting in a plurality of output current waveforms and further comprising program instructions for summing said output current waveforms to provide a pin current for an integrated circuit package containing said logical circuit blocks.

21. The workstation of claim 18, wherein said plurality of input values comprises a third time value corresponding to a supply voltage fraction of 0.3, a fourth time value corresponding to a supply voltage fraction of 0.5 and a fifth time value corresponding to a supply voltage fraction of 0.7, and wherein said coefficient corresponding to said third time value and said coefficient corresponding to said fifth time value are equal in magnitude and opposite in sign, whereby said generating may be performed in conformity with a delay time and a rise time of said logical circuit block.

22. The workstation of claim 18, wherein said plurality of input values comprises a third time value corresponding to a supply voltage fraction of 0.5, a fourth time value corresponding to another supply voltage fraction less than 0.5 by a predetermined amount, and a fifth time value corresponding to a supply voltage fraction greater than 0.5 by said predetermined amount, and wherein said coefficient corresponding to said fourth time value and said fifth time value are equal in magnitude and opposite in sign, whereby said generating may be performed in conformity with a delay time and a rise time of said logical circuit block.

23. The workstation of claim 17, wherein said plurality of input values comprises a third time value corresponding to a supply voltage fraction of 0.3, a fourth time value corresponding to a supply voltage fraction of 0.5 and a fifth time value corresponding to a supply voltage fraction of 0.7, and wherein said coefficient corresponding to said third time value and said coefficient corresponding to said fifth time value are equal in magnitude and opposite in sign, whereby said generating may be performed in conformity with a delay time and a rise time of said logical circuit block.

24. The workstation of claim 17, wherein said program instructions further comprise program instructions for:
    simulating said logical circuit block over a variety of input waveforms and circuit conditions to produce a plurality of output voltage waveforms for said logical circuit block; and
    determining said-set of coefficients each relating a time at which said output voltage waveform reaches said selected predetermined fractions of said supply voltage to times at which said output voltage waveform reaches different predetermined fractions of said supply voltage via a statistical reduction of said plurality of output voltage waveforms that maximizes the variance of times at which said output voltage waveforms reach said selected predetermined fractions of said supply voltage and minimizes the variance of other times at which said output voltage waveforms reach said different predetermined fractions of said output voltage.

* * * * *